(12) United States Patent
Shinohara et al.

(10) Patent No.: US 10,202,483 B2
(45) Date of Patent: Feb. 12, 2019

(54) POLYMERIZABLE COMPOSITION, MOLDED PRODUCT, AND USE THEREOF

(71) Applicant: Mitsui Chemicals, Inc., Minato-ku, Tokyo (JP)

(72) Inventors: Naoki Shinohara, Tokyo (JP); Nobuo Kawato, Kurume (JP); Dong Gyu Jang, Daejeon (KP); Soo Gyun Roh, Daejeon (KP)

(73) Assignee: MITSUI CHEMICALS, INC., Minato-Ku, Tokyo (JP)

( * ) Notice: Subject to any disclaimer, the term of this patent is extended or adjusted under 35 U.S.C. 154(b) by 0 days.

(21) Appl. No.: 15/501,903

(22) PCT Filed: Aug. 6, 2015

(86) PCT No.: PCT/JP2015/072332
§ 371 (c)(1),
(2) Date: Feb. 6, 2017

(87) PCT Pub. No.: WO2016/021680
PCT Pub. Date: Feb. 11, 2016

(65) Prior Publication Data
US 2017/0226267 A1 Aug. 10, 2017

(30) Foreign Application Priority Data

Aug. 7, 2014 (JP) .................................. 2014-161314
Oct. 7, 2014 (JP) .................................. 2014-206449

(51) Int. Cl.
| | |
|---|---|
| C08G 18/38 | (2006.01) |
| C08G 18/73 | (2006.01) |
| C08G 18/74 | (2006.01) |
| C08G 18/75 | (2006.01) |
| C08G 18/76 | (2006.01) |
| C08G 18/72 | (2006.01) |
| G02B 1/04 | (2006.01) |
| G02B 1/115 | (2015.01) |
| G02C 7/02 | (2006.01) |
| G02B 1/14 | (2015.01) |

(52) U.S. Cl.
CPC ......... *C08G 18/38* (2013.01); *C08G 18/3876* (2013.01); *C08G 18/72* (2013.01); *C08G 18/722* (2013.01); *C08G 18/724* (2013.01); *C08G 18/735* (2013.01); *C08G 18/74* (2013.01); *C08G 18/751* (2013.01); *C08G 18/752* (2013.01); *C08G 18/7614* (2013.01); *G02B 1/04* (2013.01); *G02B 1/041* (2013.01); *G02B 1/115* (2013.01); *G02B 1/14* (2015.01); *G02C 7/02* (2013.01)

(58) Field of Classification Search
CPC ...... C08G 18/38; C08G 18/74; C08G 18/751; C08G 18/752; C08G 18/7614; G02B 1/041
See application file for complete search history.

(56) References Cited

U.S. PATENT DOCUMENTS

| | | | |
|---|---|---|---|
| 4,775,733 | A | 10/1988 | Kanemura et al. |
| 8,097,190 | B2 | 1/2012 | Jang et al. |
| 8,222,366 | B2 | 7/2012 | Ryu et al. |
| 8,455,610 | B2 | 6/2013 | Ryu et al. |
| 8,461,238 | B2 | 6/2013 | Kawato et al. |
| 2003/0096935 | A1 | 5/2003 | Nagpal et al. |
| 2007/0155940 | A1 | 7/2007 | Nagpal et al. |
| 2009/0030170 | A1 | 1/2009 | Ryu et al. |
| 2009/0225425 | A1 | 9/2009 | Jang et al. |
| 2012/0225996 | A1 | 9/2012 | Kawato et al. |
| 2012/0277395 | A1 | 11/2012 | Ryu et al. |

(Continued)

FOREIGN PATENT DOCUMENTS

| | | |
|---|---|---|
| JP | 63-46213 A | 2/1988 |
| JP | 8-208794 A | 8/1996 |
| JP | 10-39102 A | 2/1998 |
| JP | 2001-31646 A | 2/2001 |
| KR | 10-0771176 | 10/2007 |
| KR | 10-2010-0102987 | 9/2010 |
| KR | 10-2013-0096507 | 8/2013 |
| WO | WO 03/044071 A1 | 5/2003 |
| WO | WO 2006/109765 A1 | 10/2006 |

(Continued)

OTHER PUBLICATIONS

International Search Report (PCT/ISA/210) dated Sep. 1, 2015, by the Japanese Patent Office as the International Searching Authority for International Application No. PCT/JP2015/072332.

*Primary Examiner* — Michael L Leonard
(74) *Attorney, Agent, or Firm* — Buchanan, Ingersoll & Rooney PC

(57) ABSTRACT

The polymerizable composition of the present invention includes at least one isocyanate compound (A) having a cyclic structure, selected from compounds represented by the following Formulae (1), (2), and (3), and aliphatic isocyanate compound (B) having 4 to 11 carbon atoms, and a thiol compound (C).

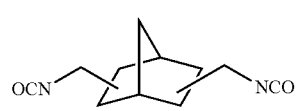

(1)

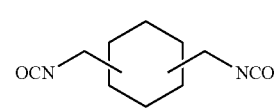

(2)

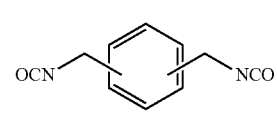

(3)

7 Claims, No Drawings

(56) References Cited

U.S. PATENT DOCUMENTS

2014/0327869 A1 11/2014 Renzi et al.
2017/0129989 A1* 5/2017 Kawato .............. C08G 18/3876

FOREIGN PATENT DOCUMENTS

| WO | WO 2008/029994 A1 | 3/2008 | |
|----|----|----|----|
| WO | WO 2011/055540 A1 | 5/2011 | |
| WO | WO 2013/073194 A1 | 5/2013 | |
| WO | WO-2016006605 A1 * | 1/2016 | ............. C08G 18/10 |

* cited by examiner

POLYMERIZABLE COMPOSITION, MOLDED PRODUCT, AND USE THEREOF

TECHNICAL FIELD

The present invention relates to a polythiourethane-based polymerizable composition, an optical molded product obtained therefrom, and use thereof.

BACKGROUND ART

Plastic lenses have a high refractive index and a high Abbe number and are light-weight, difficult to crack, and can be dyed as compared with inorganic lenses. Accordingly, they have been rapidly spreading as optical materials for eyeglass lenses, camera lenses, or the like on a commercial scale. Various molded products for lenses have hitherto been developed and used. A typical example of these materials may be an optical molded product obtained from a polymerizable composition including an isocyanate compound and a thiol compound (Patent Document 1).

Moreover, for recent eyeglass lenses, there are many cases where processing for increasing added value is carried out by, for example, providing a silicon-based hard coat layer on a lens of a substrate in order to improve hardness; and providing an inorganic oxide-based antireflection coat layer in order to suppress surface reflection. On the other hand, impact resistance may be lowered by providing these coat layers in some cases.

With a recent spread of sports glasses and children's glasses, there is a demand for eyeglass lenses having high impact resistance, such as ones that do not crack even under an impact when eyeglasses are dropped during heavy exercise or when an object such as a ball collides with a lens.

As materials for eyeglass lenses, which have high impact resistance, polycarbonate or polyureaurethane materials have been proposed.

For example, Patent Document 2 discloses that a polyureaurethane lens including a hard coat layer or an antireflection coat layer does not crack even when a missile of 1.06 grams collides therewith at a speed of 150 feet in accordance with the ANSI 287.1 standard, and thus, has very high impact resistance. However, for the manufacture of the polyureaurethane lens, it is required to prepare a prepolymer obtained by reacting an isocyanate component with an alcohol component at a high temperature 100° C. or more in advance, and a specially designed molding machine is also required during molding. Accordingly, the method for manufacturing the lens is very complicated.

On the other hand, from the viewpoints that polythiourethane materials do not require a prepolymerization reaction, and further, a special molding machine is not required, it is possible to more conveniently manufacture a lens, as compared with polyureaurethane materials. Thiourethane-based lenses including a hard coat layer and an antireflection coat layer, which have improved impact resistance, have hitherto been proposed (Patent Documents 3 to 7). These documents disclose a polymerizable composition including a specific alicyclic isocyanate compound, an aliphatic isocyanate compound, and a polythiol compound, as a composition for obtaining a lens substrate.

In addition, in the case of providing a coat layer on the surface of a lens, the surface of the lens is subjected to a surface treatment with an alkaline liquid in advance in some cases. Due to this alkali treatment, the surface of the lens has white turbidity or the like in some cases.

It is an object of the present invention to provide a polymerizable composition which has high impact resistance as well as excellent alkali resistance and appearance, as compared with a polythiourethane-based lens including a hard coat layer and an antireflection coat layer in the related art, and is capable of obtaining a lens having excellent impact resistance even in the case where a primer layer is not disposed between a base layer and a hard coat layer or antireflection coat layer.

RELATED DOCUMENT

Patent Document

[Patent Document 1] Japanese Laid-open Patent Publication No. 63-046213
[Patent Document 2] WO 2003/044071
[Patent Document 3] WO 2008/029994
[Patent Document 4] Korean Patent No. 100771176
[Patent Document 5] Korean Patent Publication No. 2010/0102987
[Patent Document 6] Korean Patent Publication No. 2013/0096507
[Patent Document 7] WO 2006/109765

SUMMARY OF THE INVENTION

The present inventors have conducted extensive studies to solve the problems, and as a result, they have found that a molded product obtained from a polymerizable composition including a specific isocyanate compound (A) having a cyclic structure, a specific aliphatic isocyanate compound (B), and a thiol compound (C) has excellent impact resistance, an excellent balance among optical characteristics such as a refractive index and an Abbe number, handling properties, transparency, and heat resistance, and excellent alkali resistance, and also has excellent impact resistance even in the case where the molded product includes a hard coat layer or an antireflection coat layer, thereby overcoming the problems, and thus leading to completion of the present invention.

Specifically, the present invention is as follows.

[1] A polymerizable composition including:
at least one isocyanate compound (A) having a cyclic structure, selected from compounds represented by the following Formulae (1), (2), and (3):

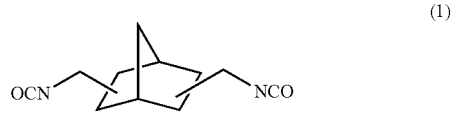

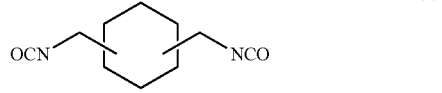

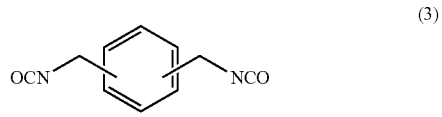

an aliphatic isocyanate compound (B) having 4 to 11 carbon atoms; and
a thiol compound (C).

[2] The polymerizable composition as described in [1], in which the thiol compound (C) is comprised of at least one selected from 4,6-bis(mercaptomethylthio)-1,3-dithiane, 2-(2,2-bis(mercaptomethylthio)ethyl)-1,3-dithiethane, pentaerythritol tetrakis(3-mercaptopropionate), pentaerythritol tetrakis(2-mercaptoacetate), trimethylolpropane tris(3-mercaptopropionate), trimethylolpropane tris(2-mercaptoacetate), 4-mercaptomethyl-1,8-dimercapto-3,6-dithiaoctane, 2,5-bismercaptomethyl-1,4-dithiane, 1,1,3,3-tetrakis(mercaptomethylthio)propane, 5,7-dimercaptomethyl-1,11-mercapto-3,6,9-trithiaundecane, 4,7-dimercaptomethyl-1,11-mercapto-3,6,9-trithiaundecane, 4,8-dimercaptomethyl-1,11-mercapto-3,6,9-trithiaundecane, ethylene glycol bis(3-mercaptopropionate), diethylene glycol bis(3-mercaptopropionate), ethylene glycol bis(2-mercaptoacetate), and diethylene glycol bis(2-mercaptoacetate).

[3] The polymerizable composition as described in [1], in which the thiol compound (C) includes an aliphatic polythiol compound having at least one ester bond within a molecule.

[4] The polymerizable composition as described in [3], in which the aliphatic polythiol compound having at least one ester bond within a molecule is comprised of at least one selected from pentaerythritol tetrakis(3-mercaptopropionate), pentaerythritol tetrakis(2-mercaptoacetate), trimethylolpropane tris(3-mercaptopropionate), trimethylolpropane tris(2-mercaptoacetate), ethylene glycol bis(3-mercaptopropionate), diethylene glycol bis(3-mercaptopropionate), ethylene glycol bis(2-mercaptoacetate), and diethylene glycol bis(2-mercaptoacetate).

[5] The polymerizable composition as described in any one of [1] to [4], in which in the case where the sum of the number of moles of the isocyanate compound (A) and the number of moles of the isocyanate compound (B) is taken as 100%, the proportion of the number of moles of the isocyanate compound (A) is 10% to 95%.

[6] A molded product formed by curing the polymerizable composition as described in any one of [1] to [5].

[7] An optical material including the molded product as described in [6].

[8] A lens including the optical material as described in [7].

[9] An eyeglass lens including the lens as described in [8].

[10] An eyeglass lens including the lens as described in [8], and a hard coat layer and/or an antireflection coat layer formed on at least one surface of the lens.

With the polymerizable composition of the present invention, it is possible to provide a molded product which has excellent impact resistance, an excellent balance among optical characteristics such as a refractive index and an Abbe number, handling properties, transparency, and heat resistance, and excellent alkali resistance, and also has excellent impact resistance even in the case where a primer layer is not disposed between a base layer and a hard coat layer or antireflection coat layer.

DESCRIPTION OF EMBODIMENTS

Hereinafter, the present invention will be described in detail.

The polymerizable composition of the present invention contains:

at least one isocyanate compound (A) having a cyclic structure, selected from compounds represented by the following Formulae (1), (2), and (3), an aliphatic isocyanate compound (B) having 4 to 11 carbon atoms, and a thiol compound (C).

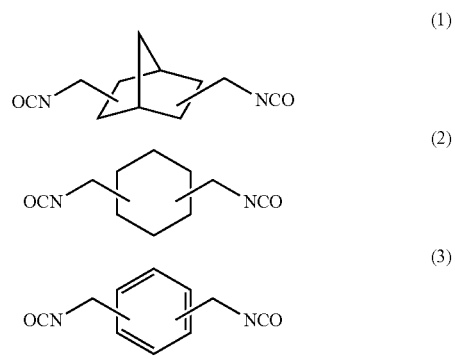

Hereinafter, the polymerizable composition of the present invention will be described with reference to embodiments, but the present invention is not limited to the exemplified compounds below. Further, in the present invention, for the respective components, exemplified compounds may be used alone or in combination of two or more kinds thereof.

The isocyanate compound (A) having a cyclic structure in the present invention is at least one compound selected from compounds represented by Formula (1), Formula (2), and Formula (3), and specific examples thereof include bis(isocyanatomethyl)-bicyclo[2.2.1]heptane, bis(isocyanatomethyl)cyclohexane, and xylylene diisocyanate, and the like.

Among these exemplified compounds, the isocyanate compound (A) having a cyclic structure is preferably at least one selected from 2,5-bis(isocyanatomethyl)-bicyclo[2.2.1]heptane, 2,6-bis(isocyanatomethyl)-bicyclo[2.2.1]heptane, 1,3-bis(isocyanatomethyl)cyclohexane, 1,4-bis(isocyanatomethyl)cyclohexane, and m-xylylene diisocyanate.

The aliphatic isocyanate compound (B) having 4 to 11 carbon atoms in the present invention is a compound which has at least two isocyanato groups within a molecule and does not include a cyclic structure or a sulfide bond. Further, the number of carbon atoms means the number of carbon atoms of an aliphatic group.

Examples of the aliphatic isocyanate compound (B) having 4 to 11 carbon atoms include tetramethylene diisocyanate, pentamethylene diisocyanate, hexamethylene diisocyanate, 2,2-dimethylpentane diisocyanate, 2,2,4-trimethylhexane diisocyanate, 2,4,4-trimethylhexamethylene diisocyanate, 1,6,11-undecatriisocyanate, 1,3,6-hexamethylene triisocyanate, 1,8-diisocyanato-4-isocyanatomethyloctane, bis(isocyanatoethyl)carbonate, and bis(isocyanatoethyl)ether, and the like.

Among these exemplified compounds, the aliphatic isocyanate compound (B) having 4 to 11 carbon atoms is preferably pentamethylene diisocyanate or hexamethylene diisocyanate.

Since the polymerizable composition of the present invention contains the isocyanate compound (A) having a cyclic structure and the aliphatic isocyanate compound (B) having 4 to 11 carbon atoms, it is possible to obtain a molded product which has excellent impact resistance, an excellent balance among optical characteristics such as a refractive index and an Abbe number, handling properties, transparency, and heat resistance, and excellent alkali resistance. Further, it is also possible to obtain a molded product including a hard coat layer and/or an antireflection coat layer, which has excellent impact resistance in a drop ball test in accordance to an FDA test even in the case where a primer layer is not disposed between a base layer and the hard coat layer or antireflection coat layer. When the molded product obtained by curing the polymerizable composition of the present invention is used, it is not necessary to provide a primer layer, and therefore, the productivity of the molded product including these layers is improved.

In the present invention, in the case where the sum of the number of moles of the isocyanate compound (A) having a cyclic structure and the number of moles of the aliphatic isocyanate compound (B) having 4 to 11 carbon atoms is taken as 100%, the proportion of the number of moles of the isocyanate compound (A) having a cyclic structure is 10% to 95%, preferably 30% to 80%, more preferably 30% to 75%, and still more preferably 30% to 60%. Within these ranges, a molded product having excellent optical characteristics such as an Abbe number and a refractive index, an excellent balance between impact resistance and heat resistance, and excellent alkali resistance and appearance (transparency) is obtained. Within these ranges, in the case where the impact resistance is considered crucial, the proportion is particularly preferably 30% to 55%, while the heat resistance is considered crucial, the proportion is particularly preferably 45% to 60%. Further, even in the case where a primer layer is not disposed between the base layer and the hard coat layer or antireflection coat layer, a molded product having excellent impact resistance can be obtained. That is, within these rages, a balance among these properties is excellent.

The polymerizable composition of the present invention may include an isocyanate compounds other than the isocyanate compound (A) having a cyclic structure and the aliphatic isocyanate compound (B) having 4 to 11 carbon atoms, to an extent not impairing the effects of the present invention.

Example of the isocyanate compounds other than the isocyanate compound (A) having a cyclic structure and the aliphatic isocyanate compound (B) having 4 to 11 carbon atoms include isophorone diisocyanate, bis(4-isocyanatocyclohexyl)methane, cyclohexane diisocyanate, methylcyclohexane diisocyanate, 2,2-bis(4-isocyanatocyclohexyl)propane, 3,8-bis(isocyanatomethyl)tricyclodecane, 3,9-bis(isocyanatomethyl)tricyclodecane, 4,8-bis(isocyanatomethyl)tricyclodecane, 4,9-bis(isocyanatomethyl)tricyclodecane, bis(isocyanatoethyl)benzene, bis(isocyanatopropyl)benzene, bis(isocyanatomethyl)naphthalene, naphthalene diisocyanate, m-phenylene diisocyanate, p-phenylene diisocyanate, 2,4-tolylene diisocyanate, 2,6-tolylene diisocyanate, biphenyldiisocyanate, benzene triisocyanate, bis(isocyanatoethyl)sulfide, bis(isocyanatopropyl)sulfide, bis(isocyanatomethyl)sulfone, bis(isocyanatomethyl)disulfide, bis(isocyanatopropyl)disulfide, bis(isocyanatomethylthio)methane, bis(isocyanatomethylthio)ethane, bis(isocyanatoethylthio)methane, bis(isocyanatoethylthio)ethane, 1,5-diisocyanato-2-isocyanatomethyl-3-thiapentane, bis(3-isocyanatophenyl)sulfide, bis(4-isocyanatophenyl)sulfide, bis(3-isocyanatomethylphenyl)sulfide, bis(4-isocyanatomethylphenyl)sulfide, bis(3-isocyanatomethylbenzyl)sulfide, bis(4-isocyanatomethylbenzyl)sulfide, bis(3-isocyanatophenyl)disulfide, bis(4-isocyanatophenyl)disulfide, bis(3-isocyanatomethylphenyl)disulfide, and bis(4-isocyanatomethylphenyl)disulfide, and the like.

The thiol compound (C) in the present invention is a compound having two or more mercapto groups within a molecule, and examples thereof include an aliphatic thiol compound and an aromatic thiol compound, and the like.

Examples of the aliphatic thiol compound include methanedithiol, 1,2-ethanedithiol, 1,2-propanedithiol, 1,3-propanedithiol, 1,4-butanedithiol, 1,5-pentanedithiol, 1,6-hexanedithiol, 1,2-cyclohexanedithiol, 3,4-dimethoxybutane-1,2-dithiol, 2-methylcyclohexane-2,3-dithiol, 1,2-dimercaptopropylmethyl ether, 2,3-dimercaptopropylmethyl ether, bis(2-mercaptoethyl)ether, tetrakis(mercaptomethyl)methane, bis(mercaptomethyl)sulfide, bis(mercaptomethyl)disulfide, bis(mercaptoethyl)sulfide, bis(mercaptoethyl)disulfide, bis(mercaptomethylthio)methane, bis(2-mercaptoethylthio)methane, 1,2-bis(mercaptomethylthio)ethane, 1,2-bis(2-mercaptoethylthio)ethane, 1,3-bis(mercaptomethylthio)propane, 1,3-bis(2-mercaptoethylthio)propane, 1,2,3-tris(mercaptomethylthio)propane, 1,2,3-tris(2-mercaptoethylthio)propane, 1,2,3-tris(3-mercaptopropylthio)propane, 4-mercaptomethyl-1,8-dimercapto-3,6-dithiaoctane, 5,7-dimercaptomethyl-1,11-dimercapto-3,6,9-trithiaundecane, 4,7-dimercaptomethyl-1,11-dimercapto-3,6,9-trithiaundecane, 4,8-dimercaptomethyl-1,11-dimercapto-3,6,9-trithiaundecane, 1,1,3,3-tetrakis(mercaptomethylthio)propane, 4,6-bis(mercaptomethylthio)-1,3-dithiane, 2-(2,2-bis(mercaptomethylthio)ethyl)-1,3-dithiethane, tetrakis(mercaptomethylthiomethyl)methane, tetrakis(2-mercaptoethylthiomethyl)methane, bis(2,3-dimercaptopropyl)sulfide, 2,5-bismercaptomethyl-1,4-dithiane, ethylene glycol bis(2-mercaptoacetate), ethylene glycol bis(3-mercaptopropionate), diethylene glycol bis(2-mercaptoacetate), diethylene glycol bis(3-mercaptopropionate), 2,3-dimercapto-1-propanol(3-mercaptopropionate), 3-mercapto-1,2-propane diol bis(2-mercaptoacetate), 3-mercapto-1,2-propane diol di(3-mercaptopropionate), trimethylolpropane tris(2-mercaptoacetate), trimethylolpropane tris(3-mercaptopropionate), trimethylolethane tris(2-mercaptoacetate), trimethylolethane tris(3-mercaptopropionate), pentaerythritol tetrakis(2-mercaptoacetate), pentaerythritol tetrakis(3-mercaptopropionate), glycerin tris(2-mercaptoacetate), glycerin tris(3-mercaptopropionate), 1,4-cyclohexane diol bis(2-mercaptoacetate), 1,4-cyclohexane diol bis(3-mercaptopropionate), hydroxymethyl sulfide bis(2-mercaptoacetate), hydroxymethyl sulfide bis(3-mercaptopropionate), hydroxyethyl sulfide (2-mercaptoacetate), hydroxyethyl sulfide (3-mercaptopropionate), hydroxymethyl disulfide (2-mercaptoacetate), hydroxymethyl disulfide (3-mercaptopropionate), thioglycolic acid bis(2-mercaptoethylester), and thiodipropionic acid bis(2-mercaptoethylester), and the like.

Examples of the aromatic thiol compound include 1,2-dimercaptobenzene, 1,3-dimercaptobenzene, 1,4-dimercaptobenzene, 1,2-bis(mercaptomethyl)benzene, 1,4-bis(mercaptomethyl)benzene, 1,2-bis(mercaptoethyl)benzene, 1,4-bis(mercaptoethyl)benzene, 1,2,3-trimercaptobenzene, 1,2,4-trimercaptobenzene, 1,3,5-trimercaptobenzene, 1,2,3-tris(mercaptomethyl)benzene, 1,2,4-tris(mercaptomethyl)benzene, 1,3,5-tris(mercaptomethyl)benzene, 1,2,3-tris(mercaptoethyl)benzene, 1,3,5-tris(mercaptoethyl)benzene, 1,2,4-tris(mercaptoethyl)benzene, 2,5-toluenedithiol, 3,4-toluenedithiol, 1,4-naphthalenedithiol, 1,5-naphthalenedithiol, 2,6-naphthalenedithiol, 2,7-naphthalenedithiol, 1,2,3,4-tetramercaptobenzene, 1,2,3,5-tetramercaptobenzene, 1,2,4,5-tetramercaptobenzene, 1,2,3,4-tetrakis(mercaptomethyl)benzene, 1,2,3,5-tetrakis(mercaptomethyl)benzene, 1,2,4,5-tetrakis(mercaptomethyl)benzene, 1,2,3,4-tetrakis(mercaptoethyl)benzene, 1,2,3,5-tetrakis(mercaptoethyl)

benzene, 1,2,4,5-tetrakis(mercaptoethyl)benzene, 2,2'-dimercaptobiphenyl, and 4,4'-dimercaptobiphenyl, and the like.

Among these exemplified compounds, the aliphatic thiol compound is preferable, and pentaerythritol tetrakis(3-mercaptopropionate), 5,7-dimercaptomethyl-1,11-dimercapto-3,6,9-trithiaundecane, 4,7-dimercaptomethyl-1,11-dimercapto-3,6,9-trithiaundecane, 4,8-dimercaptomethyl-1,11-dimercapto-3,6,9-trithiaundecane, 4-mercaptomethyl-1,8-dimercapto-3,6-dithiaoctane, 2,5-bismercaptomethyl-1,4-dithiane, 1,1,3,3-tetrakis(mercaptomethylthio)propane, 4,6-bis(mercaptomethylthio)-1,3-dithiane, 2-(2,2-bis(mercaptomethylthio)ethyl)-1,3-dithiethane, pentaerythritol tetrakis(2-mercaptoacetate), trimethylolpropane tris(3-mercaptopropionate), trimethylolpropane tris(2-mercaptoacetate), ethylene glycol bis(3-mercaptopropionate), diethylene glycol bis(3-mercaptopropionate), ethylene glycol bis(2-mercaptoacetate), and diethylene glycol bis(2-mercaptoacetate) are more preferable.

More preferably, the aliphatic thiol compound includes an aliphatic polythiol compound having at least one ester bond within a molecule, and the aliphatic polythiol compound having an ester bond within a molecule can be used alone or in combination of another aliphatic thiol compound.

As the aliphatic polythiol compound having an ester bond within a molecule, pentaerythritol tetrakis(3-mercaptopropionate), pentaerythritol tetrakis(2-mercaptoacetate), trimethylolpropane tris(3-mercaptopropionate), trimethylolpropane tris(2-mercaptoacetate), ethylene glycol bis(3-mercaptopropionate), diethylene glycol bis(3-mercaptopropionate), ethylene glycol bis(2-mercaptoacetate), and diethylene glycol bis(2-mercaptoacetate) are preferable; pentaerythritol tetrakis(3-mercaptopropionate) and pentaerythritol tetrakis(2-mercaptoacetate) are more preferable; and pentaerythritol tetrakis(3-mercaptopropionate) is particularly preferable.

Examples of other aliphatic thiol compounds which can be used in combination with the aliphatic polythiol compound having an ester bond within a molecule include the aforementioned aliphatic thiol compounds, and specifically, 4-mercaptomethyl-1,8-dimercapto-3,6-dithiaoctane, 5,7-dimercaptomethyl-1,11-dimercapto-3,6,9-trithiaundecane, 4,7-dimercaptomethyl-1,11-dimercapto-3,6,9-trithiaundecane, 4,8-dimercaptomethyl-1,11-dimercapto-3,6,9-trithiaundecane, 2,5-bismercaptomethyl-1,4-dithiane, 1,1,3,3-tetrakis(mercaptomethylthio)propane, 4,6-bis(mercaptomethylthio)-1,3-dithiane, and 2-(2,2-bis(mercaptomethylthio)ethyl)-1,3-dithiethane are preferable, and 4-mercaptomethyl-1,8-dimercapto-3,6-dithiaoctane, 5,7-dimercaptomethyl-1,11-dimercapto-3,6,9-trithiaundecane, 4,7-dimercaptomethyl-1,11-dimercapto-3,6,9-trithiaundecane, and 4,8-dimercaptomethyl-1,11-dimercapto-3,6,9-trithiaundecane are particularly preferable.

It is particularly preferable from the viewpoints of the aforementioned effects that the polymerizable composition of the present embodiment includes a combination of the compound represented by Formula (1), Formula (2), or Formula (3) as the isocyanate compound (A) having a cyclic structure, hexamethylene diisocyanate as the aliphatic isocyanate compound (B) having 4 to 11 carbon atoms, and pentaerythritol tetrakis(3-mercaptopropionate) as the thiol compound (C).

In the present invention, the molar ratio of the mercapto groups in the thiol compound (C) with respect to the total amount of the isocyanato groups in the isocyanate compound (A) having a cyclic structure, the aliphatic isocyanate compound (B) having 4 to 11 carbon atoms, and the isocyanate compound other than (A) and (B), added as necessary, is in the range of 0.8 to 1.2, preferably in the range of 0.85 to 1.15, and more preferably 0.9 to 1.1. Within the ranges, a molded product which is suitably used as an optical material, in particular, a plastic lens material for eyeglasses can be obtained.

Moreover, it is possible to add a modifier to the polymerizable composition of the present invention within a range not impairing the effects of the present invention, for the purposes of adjusting various properties such as optical properties, impact resistance, and specific gravity of the obtained molded product, and of adjusting the handling properties of the respective components in the polymerizable composition.

Examples of the modifier include an episulfide compound, an alcohol compound, an amine compound, an epoxy compound, an organic acid and an anhydride thereof, and olefin compounds including a (meth)acrylate compound. A case where a hydroxyl group is not included is preferable from the viewpoints of occurrence of irregularities during polymerization of a lens, and dyeing properties.

In the present invention, when the polythiourethane polymerizable composition is molded, depending on purposes, similarly to well-known molding methods, various additives such as a catalyst, an internal releasing agent, a chain extender, a crosslinking agent, a light stabilizer, an ultraviolet ray absorber, an antioxidant, a coloration inhibitor, an oil-soluble dye, a filler, and an adhesion improver may be added.

Examples of the catalyst include a Lewis acid, an amine, an organic acid, and an amine organic acid salt, among which the Lewis acid, the amine, and the amine organic acid salt are preferable, and dimethyl tin chloride, dibutyl tin chloride, dibutyl tin laurate are more preferable. The addition amount thereof is preferably from 0.005 parts by weight to 0.5 parts by weight, and more preferably from 0.005 parts by weight from 0.3 parts by weight, with respect to 100 parts by weight of the total amount of the isocyanate (A), the isocyanate (B), and the thiol (C).

As the internal releasing agent, an acidic phosphoric acid ester can be used. Examples of the acidic phosphoric acid ester include a phosphoric acid monoester and a phosphoric acid diester, and these may be used singly or in mixture of two or more kinds thereof.

In the case where a polymerizable composition is prepared by mixing isocyanate compound (A) having a cyclic structure, the aliphatic isocyanate compound (B) having 4 to 11 carbon atoms, and the thiol compound (C), and other components as necessary, a catalyst, an internal releasing agent, and other additives, the mixing is usually carried out at a temperature 25° C. or lower. In some cases, a lower temperature is more preferable in terms of the pot life of the polymerizable composition. However, in the case where the solubility of the catalyst, the internal releasing agent, and the additives in the polymerizable composition or the like is not favorable, it is also possible to dissolve the catalyst, the internal releasing agent, and the additives in the polymerizable composition, the modifier, or the like by warming the catalyst, the internal releasing agent, and the additive in advance.

In the present invention, a method for preparing a polythiourethane molded product is not particularly limited, but preferable examples of the preparation method include cast polymerization. First, the polymerizable composition is injected into a mold held using a gasket, a tape, or the like. At this time, there are many cases in which a degassing treatment under reduced pressure, a filtration treatment under pressure or reduced pressure are preferably carried out, as necessary, depending on the properties required for the obtained plastic lenses.

Since polymerization conditions significantly vary depending on the kinds and amounts of the polymerizable composition and the catalyst used, the shape of the mold, and the like, the polymerization conditions are not limited, but polymerization is carried out at a temperature of approximately −50° C. to 150° C. for 1 to 50 hours. The polymerizable composition is preferably held in a temperature range of 5° C. to 150° C. or slowly warmed, and cured, but the temperature may be suitably adjusted.

The polythiourethane molded product of the present invention may be subjected to an annealing treatment and the like, as necessary. The treatment temperature is usually 50 to 150° C., but is preferably 90 to 140° C., and more preferably 100 to 130° C.

Molded products having various shapes can be obtained from the polythiourethane polymerizable composition of the present invention by changing molds during cast polymerization. The molded product of the present invention can be used as various optical materials by forming them into desired shapes and incorporating coating layers formed, as necessary, other members, and the like.

The molded product obtained by curing the polymerizable composition of the present invention has a high refractive index and high transparency, and can be used for optical molded products such as eyeglass lenses, camera lenses, light emitting diodes (LED), prisms, optical fibers, information recording substrates, filters, and light-emitting diodes, and in optical materials therefor. The molded product is particularly suitable as optical materials of lenses such as eyeglass lenses and camera lenses, and of light emitting diodes.

The molded product obtained by curing the polymerizable composition of the present invention may be provided with a coating layer over a single surface or both surfaces as necessary, and then used. Examples of the coating layer include a hard coat layer, an antireflection film layer, an antifog coated film layer, an antifouling layer, a water repellent layer, a primer layer, and a photochromic layer, and the like. These coating layers may be used singly or as a multilayered body formed of a plurality of the coating layers. In the case where the coating layers are formed over both surfaces, the same coating layers may be provided over the respective surfaces or different coating layers may be provided.

The eyeglass lens of the present invention may include a hard coat layer and/or an antireflection coat layer formed over at least one surface of a molded product (lens) obtained by curing the polymerizable composition of the present invention. Further, the eyeglass lens may also include layers other than the above layer (s). Since the eyeglass lens of the present invention uses a lens including the polymerizable composition of the present invention, then even in the case where a primer layer is not disposed between the base layer and the hard coat layer or antireflection coat layer, the impact resistance is excellent. That is, in the present embodiment, a hard coat layer and/or an antireflection coat layer may be directly formed over at least one surface of the base layer. By using the molded product obtained by curing the polymerizable composition of the present invention as a substrate of a lens, it is not necessary to provide a primer layer, and therefore, the productivity of the eyeglass lens is improved.

The hard coat layer is provided over at least one surface of a molded product (lens) obtained by curing the polymerizable composition of the present invention, and is a coating layer aiming to impart scratch resistance, wear resistance, humidity resistance, hot water resistance, heat resistance, light resistance, and the like to the surface of the lens. The hard coat layer is obtained from a composition containing at least one oxide of metal selected from an element group of silicon, zirconium, antimony, tin, aluminum, tungsten, and antimony, a silane compound having at least one functional group selected from an alkyl group, an aryl group, an alkoxy group, a methacryloxy group, an acryloxy group, an epoxy group, an amino group, an isocyanato group, and a mercapto group, and a hydrolysate thereof.

A curing agent may be included in the hard coat composition for the purpose of accelerating the curing. Specific examples of the curing agent include inorganic acids, organic acids, amines, metal complexes, organic acid metal salts, and metal chlorides. For the preparation of the hard coat composition, a solvent may be used. Specific examples of the solvent include water, alcohols, ethers, ketones, and esters.

The hard coat layer is formed by coating the hard coating composition onto the surface of the molded product, using a well-known coating method such as spin coating and dip coating. Examples of the curing method include curing methods using thermal curing or radiation of energy rays such as ultraviolet rays and visible light rays. In the case of heating and curing, the heating and the curing are preferably carried out at 80° C. to 120° C. for 1 to 4 hours. In order to suppress the generation of interference fringes, the refractive index of the hard coat layer is preferably within the range of a difference in the refractive index of the molded product of ±0.1.

Before applying the hard coat layer, the surface of the substrate is preferably subjected to ultrasonic washing with an aqueous alkali solution so as to satisfy the following conditions (a) to (d):

(a) the aqueous alkali solution is a 5% to 40% aqueous sodium hydroxide or potassium hydroxide solution, (b) the treatment temperature of the aqueous alkali solution is 30° C. to 60° C., (c) the treatment time is 3 to 5 minutes, and (d) the frequency of the ultrasonic wave is 20 to 30 kHz.

After washing with an aqueous alkali solution, the substrate may be washed with alcohols such as distilled water and isopropanol, or the like and may be dried the surface of the molded product in the range of 50° C. to 80° C. for 5 minutes to 20 minutes.

The molded product obtained from the polymerizable composition of the present invention has excellent alkali resistance, and even after washing with an aqueous alkali solution, occurrence of white turbidity or the like is suppressed.

The antireflection layer is a coating layer in which a molded product (lens) is provided on at least surface thereof, and has a purpose of lowering the reflection rate generated from the difference in the refractive index between air and the molded product and significantly reducing the reflection of light on the surface of the plastic lens to increase the transmittance. The antireflection layer in the present embodiment includes a low-refractive index film layer containing silicon oxide, and a high-refractive index film layer containing at least one metal oxide selected from titanium oxide, zirconium oxide, aluminum oxide, zinc oxide, cerium oxide, antimony oxide, tin oxide, and tantalum oxide, and each of the layers may be a monolayer or multilayer structure.

In the case where the antireflection layer is a multilayer structure, 5 to 7 layers are preferably laminated. The film thickness is preferably 100 to 300 nm, and more preferably 150 to 250 nm. Examples of the method for forming the multilayer antireflection layer include a vacuum deposition method, a sputtering method, an ion plating method, an ion beam assisting method, and a CVD method.

The antifog coated film layer, the antifouling layer, and the water repellent layer may be formed on the antireflection film layer, as necessary. Regarding a method for forming the antifog coated layer, the antifouling layer, and the water repellent layer, the treatment method, the treatment materials, and the like therefor are not particularly limited as long as no adverse influences are brought to the antireflection function, and well-known antifog coating treatment methods, antifouling treatment methods, water repellent treatment methods, and materials can be used. Examples of the antifog coating method and the antifouling treatment method include a method in which the surface is covered with a surfactant, a method in which a hydrophilic film is added to the surface so as to provide water absorbability, a method in which the surface is coated with fine irregularity so as to enhance water absorbability, a method in which a photocatalytic activity is used so as to provide water absorbability, a method in which a super water repellent treatment is carried out so as to prevent attachment of water droplets, and the like. In addition, examples of the water repellent treatment method include a method in which a water repellency-provided layer is formed using a fluorine-containing silane compound or the like by deposition or sputtering, and a method in which a fluorine-containing silane compound is dissolved in a solvent and then coated so as to form a water repellency-treated layer.

An ultraviolet ray absorber for protecting lenses or eyes from ultraviolet rays, an infrared ray absorber for protecting the eyes from infrared rays, a light stabilizer or antioxidant for improving the weather resistance of lenses, a dye or pigment for enhancing the aesthetic appearance of lenses, a photochromatic dye or photochromatic pigment, an antistatic agent, or other known additives for enhancing the performance of lens may also be used in combination with other components. For the layer in which coating is performed by application, various leveling agents for improving the coatability may also be used.

The plastic lenses using the polythiourethane polymerizable composition of the present invention aims to impart, for example, aesthetic appearance or photochromatic properties, and may also be used after being dyed using a dye depending on purposes. The dyeing of lenses can be carried out using a known dyeing method, but is usually carried out by the method shown below.

Generally, the method involves immersing a lens fabric prepared on a predetermined optical surface in a dyeing solution in which a pigment to be used is dissolved or homogeneously dispersed (dyeing step), and then heating the lens as necessary so as to fix the pigment (annealing-after-dyeing step). The dye used in the dyeing step is not particularly limited as long as the pigment is a known pigment, and generally, an oil-soluble dye or dispersion dye is used. The solvent used in the dyeing step is not particularly limited as long as the solvent can dissolve or homogeneously disperse the pigment to be used. In the dyeing step, a surfactant for dispersing the pigment in the dyeing solution or a carrier for accelerating dyeing may be added as necessary.

In the dyeing step, a pigment, and a surfactant which is added as necessary are dispersed in water or a mixture of water and an organic solvent so as to prepare a dyeing bath, an optical lens is immersed in the dyeing bath, and dyed at a predetermined temperature for a predetermined period. The dyeing temperature and period vary depending on a desired dyeing concentration, but in general, dyeing may be carried out at a temperature equal to or lower than 120° C. for approximately several minutes to several tens of hours, and the dyeing concentration of the dyeing bath is 0.01 to 10% by weight. In addition, in the case where it is difficult to perform dyeing, dyeing may be carried out under pressurization.

The annealing-after-dyeing step which is carried out as necessary is a step in which a heating treatment is carried out on a dyed lens fabric. In the heating treatment, water remaining on the surface of the lens fabric dyed in the dyeing step is removed using a solvent or the like, or the solvent is dried using wind, and then the lens fabric is held in a furnace, such as an infrared ray heating furnace under the atmosphere or a resistance heating furnace, for a predetermined period. In the annealing-after-dyeing step, bleaching of the dyed lens fabric is prevented (bleaching-prevention treatment), and moisture which has intruded into the lens fabric during dyeing is removed. In the present invention, in the case where an alcohol compound is not included, the irregularities after dyeing are little.

In the present invention, a polarizing lens can be obtained by laminating a molded product obtained by curing the polymerizable composition of the present invention over at least one surface of a polarizing film. The preparation method is not particularly limited, and a well-known method can be employed. Examples of the polarizing film include thermoplastic polyesters such as polyethylene terephthalate, and polyvinyl alcohol.

Aspects of the present invention are described above, but various aspects can be employed within a range not impairing the effects of the present invention.

EXAMPLES

Hereinafter, the present invention will be specifically described based on Examples, but the present invention is not limited these Examples. In the performance tests of the molded product obtained by curing the polymerizable composition of the present invention, the refractive indexes, the Abbe numbers, the specific gravities, the heat resistance, and the impact resistance were evaluated using the following methods.

Refractive indexes (ne) and Abbe numbers (ve): Measured at 20° C. using a PULFRICH refractometer.

Specific gravities: Measured using an Archimedes method.

Heat resistance: The glass transition temperature was measured using a TMA penetration method (50 g of a load, 0.5 mmφ at the tip of a pin, and a temperature-rise rate of 10° C./min).

Impact resistance: Using an automatic drop weight impact test machine "HYDROSHOT" (Model HITS-P10) manufactured by Shimadzu Corporation, the manufactured molded product was fixed to a pedestal with a diameter of 40 mm in accordance with JIS K7211-2, a striker having a diameter of 20 mm was collided and penetrated at a speed of 4.4 m/sec, and the fracture energy (J) generated at the time of impact was calculated. Three molded products were tested and an average value of the three products with the fracture energy was calculated. Further, the shape of the molded product used in the measurement is a 4 curve shape having a thickness of 2 mm and a diameter of 75 mm, and has a hard coat layer and an antireflection layer.

Drop ball test: For the lenses each having a shape of a central thickness of 1.1 mm to 1.2 mm, a diameter of 75 mm, and S=−1.75D, in which a hard coat layer and an antireflection layer were stacked, 11 kinds of iron balls having different weights of 8 g, 16 g, 28 g, 33 g, 45 g, 67 g, 95 g, 112 g, 174 g, 226 g, and 534 g were dropped in this order onto the center of the lens from the position at a height of 127 cm (50 inches), and it was tested whether the lenses were damaged. For evaluation, the tests were carried out on five lenses and the maximum weight when not even one lens was damaged was recorded.

Alkali test: A lens having a shape of a central thickness of 1.1 mm to 1.2 mm, a diameter of 75 mm, and S=−1.75D was immersed in a 15% aqueous potassium hydroxide solution warmed at 60° C. After the immersion, the lens was subjected to an ultrasonic treatment and taken up every 10 minute to observe the presence or absence of white turbidity in the lens. In observation after 30 minutes, presence of white turbidity in the lens was denoted by x and absence of white turbidity in the lens was denoted by O.

Appearance: The appearance of the lenses immediately after the release was observed under irradiation with a high-pressure mercury lamp. A case with no turbidity in the lens was denoted by ° and a case with turbidity in the lens was denoted by x.

Example 1

16.8 parts by weight of a mixture of 2,5-bis(isocyanatomethyl)-bicyclo[2.2.1]heptane and 2,6-bis(isocyanatomethyl)-bicyclo[2.2.1]heptane, 25.8 parts by weight of hexamethylene diisocyanate, 57.4 parts by weight of pentaerythritol tetrakis(3-mercaptopropionate), 0.05 parts by weight of dibutyl tin dichloride, 2.0 parts by weight of an ultraviolet ray absorber (manufactured by Kyodo Chemical Co., Ltd., product name: VIOSORB 583), and 0.065 parts by weight of an internal releasing agent (acidic phosphoric acid ester, manufactured by Mitsui Chemicals, Inc., product name: Internal Releasing Agent for MR) were mixed and dissolved to produce a homogeneous solution. This mixed solution was degassed at 400 Pa for 1 hour, then filtered using a 1 μm PTFE-made filter, and injected into a mold composed of a glass mold and a tape. The mold was put into a polymerization oven and slowly heated from 25° C. to 120° C. for 21 hours so as to perform polymerization. After the completion of polymerization, the mold was removed from the oven. The release properties of a molded product from the mold were good. The obtained molded product was further subjected to an annealing treatment at 130° C. for 2 hours.

After the annealing treatment, the molded product was washed with a 10% aqueous potassium hydroxide solution in an ultrasonic washing bath at 50° C. for 5 minutes. Thereafter, the molded product was washed with distilled water and isopropanol, and the surface of the lens was dried at 50° C. The washed molded product was immersed in a hard coat composition containing silicon oxide, trimethoxymethylsilane and a hydrolysate thereof, taken up at a speed of 150 mm/min to coat the molded product. Thereafter, the molded product was preheated at 80° C. for 10 minutes, and then heated and cured at 110° C. for 2 hours to form a hard coat layer. A multilayered antireflection layer with five layers, including silicon oxide/zirconium oxide was formed on the molded product provided with a hard coat layer, using a vacuum deposition device, thereby obtaining a coat layer-attached lens.

Furthermore, the obtained molded product was transparent, coloration of the molded product was not observed, and the molded product had a refractive index (ne) of 1.56, an Abbe number (νe) of 41, a specific gravity of 1.29, and a heat resistance of 81° C., and was thus suitable as an optical material. Further, the molded product was subjected to an alkali test, and thus, a deterioration such as white turbidity was not observed even after 30 minutes have passed in the lens. In addition, the appearance of the lens immediately after release was observed under irradiation with a high-pressure mercury lamp or the like, and thus, turbidity was not observed.

In addition, the coat layer-attached lens was subjected to an impact resistance test in accordance with JIS K7211-2 to calculate a fracture energy, which was found to be 10.6 J. The lens was subjected to a drop ball test, and thus, even when 534 g of an iron ball was dropped, the lens was not damaged. The evaluation results are shown in Table-1.

Example 2

23.9 parts by weight of a mixture of 2,5-bis(isocyanatomethyl)-bicyclo[2.2.1]heptane and 2,6-bis(isocyanatomethyl)-bicyclo[2.2.1]heptane, 19.5 parts by weight of hexamethylene diisocyanate, 56.6 parts by weight of pentaerythritol tetrakis(3-mercaptopropionate), 0.05 parts by weight of dibutyl tin dichloride, 2.0 parts by weight of an ultraviolet ray absorber (manufactured by Kyodo Chemical Co., Ltd., product name: VIOSORB 583), and 0.065 parts by weight of an internal releasing agent (acidic phosphoric acid ester, manufactured by Mitsui Chemicals, Inc., product name: Internal Releasing Agent for MR) were mixed and dissolved to produce a homogeneous solution. This mixed solution was degassed at 400 Pa for 1 hour, then filtered using a 1 μm PTFE-made filter, and injected into a mold composed of a glass mold and a tape. The mold was put into a polymerization oven and slowly heated from 25° C. to 120° C. for 21 hours so as to perform polymerization. After the completion of polymerization, the mold was removed from the oven. The release properties of a molded product from the mold were good. The obtained molded product was further subjected to an annealing treatment at 130° C. for 2 hours.

After the annealing treatment, the molded product was washed with a 10% aqueous potassium hydroxide solution in an ultrasonic washing bath at 50° C. for 5 minutes. Thereafter, the molded product was washed with distilled water and isopropanol, and the surface of the lens was dried at 50° C. The washed molded product was immersed in a hard coat composition containing silicon oxide, trimethoxymethylsilane and a hydrolysate thereof, taken up at a speed of 150 mm/min to coat the molded product. Thereafter, the molded product was preheated at 80° C. for 10 minutes, and then heated and cured at 110° C. for 2 hours to form a hard coat layer. A multilayered antireflection layer with five layers, including silicon oxide/zirconium oxide was formed on the molded product provided with a hard coat layer, using a vacuum deposition device, thereby obtaining a coat layer-attached lens.

Furthermore, the obtained molded product was transparent, coloration of the molded product was not observed, and the molded product had a refractive index (ne) of 1.56, an Abbe number (ve) of 41, a specific gravity of 1.30, and a heat resistance of 87° C., and was thus suitable as an optical material. Further, the molded product was subjected to an alkali test, and thus, a deterioration such as white turbidity was not observed even after 30 minutes have passed in the lens. In addition, the appearance of the lens immediately after release was observed under irradiation with a high-pressure mercury lamp or the like, and thus, turbidity was not observed.

In addition, the coat layer-attached lens was subjected to an impact resistance test in accordance with JIS K7211-2 to calculate a fracture energy, which was found to be 6.2 J. The lens was subjected to a drop ball test, and thus, even when 534 g of an iron ball was dropped, the lens was not damaged. The evaluation results are shown in Table-1.

Example 3

22.0 parts by weight of a mixture of 2,5-bis(isocyanatom-ethyl)-bicyclo[2.2.1]heptane and 2,6-bis(isocyanatom-ethyl)-bicyclo[2.2.1]heptane, 27.0 parts by weight of hex-amethylene diisocyanate, 16.3 parts by weight of pentaerythritol tetrakis(3-mercaptopropionate), 34.7 parts by weight of 4-mercaptomethyl-1,8-dimercapto-3,6-dithi-aoctane, 0.10 parts by weight of dibutyl tin dichloride, 1.2 parts by weight of an ultraviolet ray absorber (manufactured by Kyodo Chemical Co., Ltd., product name: VIOSORB 583), and 0.065 parts by weight of an internal releasing agent (acidic phosphoric acid ester, manufactured by Mitsui Chemicals, Inc., product name: Internal Releasing Agent for MR) were mixed and dissolved to produce a homogeneous solution. This mixed solution was degassed at 400 Pa for 1 hour, then filtered using a 1 μm PTFE-made filter, and injected into a mold composed of a glass mold and a tape. The mold was put into a polymerization oven and slowly heated from 25° C. to 120° C. for 21 hours so as to perform polymerization. After the completion of polymerization, the mold was removed from the oven. The release properties of a molded product from the mold were good. The obtained molded product was further subjected to an annealing treatment at 130° C. for 2 hours.

After the annealing treatment, the molded product was washed with a 10% aqueous potassium hydroxide solution in an ultrasonic washing bath at 50° C. for 5 minutes. Thereafter, the molded product was washed with distilled water and isopropanol, and the surface of the lens was dried at 50° C. The washed molded product was immersed in a hard coat composition containing silicon oxide, trimethoxymethylsilane and a hydrolysate thereof, taken up at a speed of 150 mm/min to coat the molded product. Thereafter, the molded product was preheated at 80° C. for 10 minutes, and then heated and cured at 110° C. for 2 hours to form a hard coat layer. A multilayered antireflection layer with five layers, including silicon oxide/zirconium oxide was formed on the molded product provided with a hard coat layer, using a vacuum deposition device, thereby obtaining a coat layer-attached lens.

Furthermore, the obtained molded product was transparent, coloration of the molded product was not observed, and the molded product had a refractive index (ne) of 1.60, an Abbe number (ve) of 39, a specific gravity of 1.29, and a heat resistance of 83° C., and was thus suitable as an optical material. Further, the molded product was subjected to an alkali test, and thus, a deterioration such as white turbidity was not observed even after 30 minutes have passed in the lens. In addition, the appearance of the lens immediately after release was observed under irradiation with a high-pressure mercury lamp or the like, and thus, turbidity was not observed.

In addition, the coat layer-attached lens was subjected to an impact resistance test in accordance with JIS K7211-2 to calculate a fracture energy, which was found to be 11.2 J. The lens was subjected to a drop ball test, and thus, even when 534 g of an iron ball was dropped, the lens was not damaged. The evaluation results are shown in Table-1.

Example 4

29.9 parts by weight of a mixture of 2,5-bis(isocyanatom-ethyl)-bicyclo[2.2.1]heptane and 2,6-bis(isocyanatom-ethyl)-bicyclo[2.2.1]heptane, 19.9 parts by weight of hex-amethylene diisocyanate, 16.0 parts by weight of pentaerythritol tetrakis(3-mercaptopropionate), 34.2 parts by weight of 4-mercaptomethyl-1,8-dimercapto-3,6-dithi-aoctane, 0.10 parts by weight of dibutyl tin dichloride, 1.2 parts by weight of an ultraviolet ray absorber (manufactured by Kyodo Chemical Co., Ltd., product name: VIOSORB 583), and 0.065 parts by weight of an internal releasing agent (acidic phosphoric acid ester, manufactured by Mitsui Chemicals, Inc., product name: Internal Releasing Agent for MR) were mixed and dissolved to produce a homogeneous solution. This mixed solution was degassed at 400 Pa for 1 hour, then filtered using a 1 μm PTFE-made filter, and injected into a mold composed of a glass mold and a tape. The mold was put into a polymerization oven and slowly heated from 25° C. to 120° C. for 21 hours so as to perform polymerization. After the completion of polymerization, the mold was removed from the oven. The release properties of a molded product from the mold were good. The obtained molded product was further subjected to an annealing treatment at 130° C. for 2 hours.

After the annealing treatment, the molded product was washed with a 10% aqueous potassium hydroxide solution in an ultrasonic washing bath at 50° C. for 5 minutes. Thereafter, the molded product was washed with distilled water and isopropanol, and the surface of the lens was dried at 50° C. The washed molded product was immersed in a hard coat composition containing silicon oxide, trimethoxymethylsilane and a hydrolysate thereof, taken up at a speed of 150 mm/min to coat the molded product. Thereafter, the molded product was preheated at 80° C. for 10 minutes, and then heated and cured at 110° C. for 2 hours to form a hard coat layer. A multilayered antireflection layer with five layers, including silicon oxide/zirconium oxide was formed on the molded product provided with a hard coat layer, using a vacuum deposition device, thereby obtaining a coat layer-attached lens.

Furthermore, the obtained molded product was transparent, coloration of the molded product was not observed, and the molded product had a refractive index (ne) of 1.60, an Abbe number (ve) of 39, a specific gravity of 1.30, and a heat resistance of 91° C., and was thus suitable as an optical material. Further, the molded product was subjected to an alkali test, and thus, a deterioration such as white turbidity was not observed even after 30 minutes have passed in the lens. In addition, the appearance of the lens immediately after release was observed under irradiation with a high-pressure mercury lamp or the like, and thus, turbidity was not observed.

In addition, the coat layer-attached lens was subjected to an impact resistance test in accordance with JIS K7211-2 to calculate a fracture energy, which was found to be 4.4 J. The lens was subjected to a drop ball test, and thus, even when 534 g of an iron ball was dropped, the lens was not damaged. The evaluation results are shown in Table-1.

Example 5

35.8 parts by weight of m-xylylene diisocyanate, 7.7 parts by weight of hexamethylene diisocyanate, 56.5 parts by weight of pentaerythritol tetrakis(3-mercaptopropionate), 0.01 parts by weight of dibutyl tin dichloride, 1.5 parts by weight of an ultraviolet ray absorber (manufactured by Kyodo Chemical Co., Ltd., product name: VIOSORB 583), and 0.10 parts by weight of an internal releasing agent (acidic phosphoric acid ester, manufactured by Mitsui Chemicals, Inc., product name: Internal Releasing Agent for MR) were mixed and dissolved to produce a homogeneous solution. This mixed solution was degassed at 400 Pa for 1 hour, then filtered using a 1 μm PTFE-made filter, and injected into a mold composed of a glass mold and a tape. The mold was put into a polymerization oven and slowly heated from 25° C. to 120° C. for 21 hours so as to perform polymerization. After the completion of polymerization, the mold was removed from the oven. The release properties of a molded product from the mold were good. The obtained molded product was further subjected to an annealing treatment at 130° C. for 2 hours.

After the annealing treatment, the molded product was washed with a 10% aqueous potassium hydroxide solution in an ultrasonic washing bath at 50° C. for 5 minutes. Thereafter, the molded product was washed with distilled water and isopropanol, and the surface of the lens was dried at 50° C. The washed molded product was immersed in a hard coat composition containing silicon oxide, trimethoxymethylsilane and a hydrolysate thereof, taken up at a speed of 150 mm/min to coat the molded product. Thereafter, the molded product was preheated at 80° C. for 10 minutes, and then heated and cured at 110° C. for 2 hours to form a hard coat layer. A multilayered antireflection layer with five layers, including silicon oxide/zirconium oxide was formed on the molded product provided with a hard coat layer, using a vacuum deposition device, thereby obtaining a coat layer-attached lens.

Furthermore, the obtained molded product was transparent, coloration of the molded product was not observed, and the molded product had a refractive index (ne) of 1.59, an Abbe number (ve) of 35, a specific gravity of 1.32, and heat resistance of 85° C., and was thus suitable as an optical material. Further, the molded product was subjected to an alkali test, and thus, a deterioration such as white turbidity was not observed even after 30 minutes have passed in the lens. In addition, the appearance of the lens immediately after release was observed under irradiation with a high-pressure mercury lamp or the like, and thus, turbidity was not observed.

In addition, the coat layer-attached lens was subjected to an impact resistance test in accordance with JIS K7211-2 to calculate a fracture energy, which was found to be 14.0 J. The evaluation results are shown in Table-1.

Example 6

16.0 parts by weight of 1,3-bis(isocyanatomethyl)cyclohexane, 26.0 parts by weight of hexamethylene diisocyanate, 58.0 parts by weight of pentaerythritol tetrakis(3-mercaptopropionate), 0.05 parts by weight of dibutyl tin dichloride, 1.5 parts by weight of an ultraviolet ray absorber (manufactured by Kyodo Chemical Co., Ltd., product name: VIOSORB 583), and 0.065 parts by weight of an internal releasing agent (acidic phosphoric acid ester, manufactured by Mitsui Chemicals, Inc., product name: Internal Releasing Agent for MR) were mixed and dissolved to produce a homogeneous solution. This mixed solution was degassed at 400 Pa for 1 hour, then filtered using a 1 μm PTFE-made filter, and injected into a mold composed of a glass mold and a tape. The mold was put into a polymerization oven and slowly heated from 25° C. to 120° C. for 21 hours so as to perform polymerization. After the completion of polymerization, the mold was, removed from the oven. The release properties of a molded product from the mold were good. The obtained molded product was further subjected to an annealing treatment at 130° C. for 2 hours.

After the annealing treatment, the molded product was washed with a 10% aqueous potassium hydroxide solution in an ultrasonic washing bath at 50° C. for 5 minutes. Thereafter, the molded product was washed with distilled water and isopropanol, and the surface of the lens was dried at 50° C. The washed molded product was immersed in a hard coat composition containing silicon oxide, trimethoxymethylsilane and a hydrolysate thereof, taken up at a speed of 150 mm/min to coat the molded product. Thereafter, the molded product was preheated at 80° C. for 10 minutes, and then heated and cured at 110° C. for 2 hours to form a hard coat layer. A multilayered antireflection layer with five layers, including silicon oxide/zirconium oxide was formed on the molded product provided with a hard coat layer, using a vacuum deposition device, thereby obtaining a coat layer-attached lens.

Furthermore, the obtained molded product was transparent, coloration of the molded product was not observed, and the molded product had a refractive index (ne) of 1.56, an Abbe number (ve) of 41, a specific gravity of 1.28, and heat resistance of 77° C., and was thus suitable as an optical material. Further, the molded product was subjected to an alkali test, and thus, a deterioration such as white turbidity was not observed even after 30 minutes have passed in the lens. In addition, the appearance of the lens immediately after release was observed under irradiation with a high-pressure mercury lamp or the like, and thus, turbidity was not observed.

In addition, the coat layer-attached lens was subjected to an impact resistance test in accordance with JIS K7211-2 to calculate a fracture energy, which was found to be 10.5 J. The evaluation results are shown in Table-1.

Example 7

16.0 parts by weight of 1,4-bis(isocyanatomethyl)cyclohexane, 26.0 parts by weight of hexamethylene diisocyanate, 58.0 parts by weight of pentaerythritol tetrakis(3-mercaptopropionate), 0.05 parts by weight of dibutyl tin dichloride, 1.5 parts by weight of an ultraviolet ray absorber (manufactured by Kyodo Chemical Co., Ltd., product name: VIOSORB 583), and 0.065 parts by weight of an internal releasing agent (acidic phosphoric acid ester, manufactured by Mitsui Chemicals, Inc., product name: Internal Releasing Agent for MR) were mixed and dissolved to produce a homogeneous solution. This mixed solution was degassed at 400 Pa for 1 hour, then filtered using a 1 μm PTFE-made filter, and injected into a mold composed of a glass mold and a tape. The mold was put into a polymerization oven and slowly heated from 25° C. to 120° C. for 21 hours so as to perform polymerization. After the completion of polymerization, the mold was removed from the oven. The release properties of a molded product from the mold were good.

The obtained molded product was further subjected to an annealing treatment at 130° C. for 2 hours.

After the annealing treatment, the molded product was washed with a 10% aqueous potassium hydroxide solution in an ultrasonic washing bath at 50° C. for 5 minutes. Thereafter, the molded product was washed with distilled water and isopropanol, and the surface of the lens was dried at 50° C. The washed molded product was immersed in a hard coat composition containing silicon oxide, trimethoxymethylsilane and a hydrolysate thereof, taken up at a speed of 150 mm/min to coat the molded product. Thereafter, the molded product was preheated at 80° C. for 10 minutes, and then heated and cured at 110° C. for 2 hours to form a hard coat layer. A multilayered antireflection layer with five layers, including silicon oxide/zirconium oxide was formed on the molded product provided with a hard coat layer, using a vacuum deposition device, thereby obtaining a coat layer-attached lens.

Furthermore, the obtained molded product was transparent, coloration of the molded product was not observed, and the molded product had a refractive index (ne) of 1.56, an Abbe number (ve) of 41, a specific gravity of 1.29, and heat resistance of 82° C., and was thus suitable as an optical material. Further, the molded product was subjected to an alkali test, and thus, a deterioration such as white turbidity was not observed even after 30 minutes have passed in the lens. In addition, the appearance of the lens immediately after release was observed under irradiation with a high-pressure mercury lamp or the like, and thus, turbidity was not observed.

In addition, the coat layer-attached lens was subjected to an impact resistance test in accordance with JIS K7211-2 to calculate a fracture energy, which was found to be 10.9 J. The evaluation results are shown in Table-1.

Example 8

16.4 parts by weight of a mixture of 2,5-bis(isocyanatomethyl)-bicyclo[2.2.1]heptane and 2,6-bis(isocyanatomethyl)-bicyclo[2.2.1]heptane, 31.2 parts by weight of hexamethylene diisocyanate, 16.2 parts by weight of pentaerythritol tetrakis(3-mercaptopropionate), 36.2 parts by weight of a mixture of 5,7-dimercaptomethyl-1,11-dimercapto-3,6,9-trithiaundecane, 4,7-dimercaptomethyl-1,11-dimercapto-3,6,9-trithiaundecane, and 4,8-dimercaptomethyl-1,11-dimercapto-3,6,9-trithiaundecane, 0.10 parts by weight of dibutyl tin dichloride, 1.2 parts by weight of an ultraviolet ray absorber (manufactured by Kyodo Chemical Co., Ltd., product name: VIOSORB 583), and 0.065 parts by weight of an internal releasing agent (acidic phosphoric acid ester, manufactured by Mitsui Chemicals, Inc., product name: Internal Releasing Agent for MR) were mixed and dissolved to produce a homogeneous solution. This mixed solution was degassed at 400 Pa for 1 hour, then filtered using a 1 μm PTFE-made filter, and injected into a mold composed of a glass mold and a tape. The mold was put into a polymerization oven and slowly heated from 25° C. to 120° C. for 21 hours so as to perform polymerization. After the completion of polymerization, the mold was removed from the oven. The release properties of a molded product from the mold were good. The obtained molded product was further subjected to an annealing treatment at 130° C. for 2 hours.

After the annealing treatment, the molded product was washed with a 10% aqueous potassium hydroxide solution in an ultrasonic washing bath at 50° C. for 5 minutes. Thereafter, the molded product was washed with distilled water and isopropanol, and the surface of the lens was dried at 50° C. The washed molded product was immersed in a hard coat composition containing silicon oxide, trimethoxymethylsilane and a hydrolysate thereof, taken up at a speed of 150 mm/min to coat the molded product. Thereafter, the molded product was preheated at 80° C. for 10 minutes, and then heated and cured at 110° C. for 2 hours to form a hard coat layer. A multilayered antireflection layer with five layers, including silicon oxide/zirconium oxide was formed on the molded product provided with a hard coat layer, using a vacuum deposition device, thereby obtaining a coat layer-attached lens.

Furthermore, the obtained molded product was transparent, coloration of the molded product was not observed, and the molded product had a refractive index (ne) of 1.61, an Abbe number (ve) of 40, a specific gravity of 1.30, and heat resistance of 88° C., and was thus suitable as an optical material. Further, the molded product was subjected to an alkali test, and thus, a deterioration such as white turbidity was not observed even after 30 minutes have passed in the lens. In addition, the appearance of the lens immediately after release was observed under irradiation with a high-pressure mercury lamp or the like, and thus, turbidity was not observed.

In addition, the coat layer-attached lens was subjected to an impact resistance test in accordance with JIS K7211-2 to calculate a fracture energy, which was found to be 4.3 J. The evaluation results are shown in Table-1.

Comparative Example 1

15.5 parts by weight of isophorone diisocyanate, 27.5 parts by weight of hexamethylene diisocyanate, 57.0 parts by weight of pentaerythritol tetrakis(3-mercaptopropionate), 0.17 parts by weight of dibutyl tin dichloride, 2.0 parts by weight of an ultraviolet ray absorber (manufactured by Kyodo Chemical Co., Ltd., product name: VIOSORB 583), and 0.065 parts by weight of an internal releasing agent (acidic phosphoric acid ester, manufactured by Mitsui Chemicals, Inc., product name: Internal Releasing Agent for MR) were mixed and dissolved to produce a homogeneous solution. This mixed solution was degassed at 400 Pa for 1 hour, then filtered using a 1 μm PTFE-made filter, and injected into a mold composed of a glass mold and a tape. The mold was put into a polymerization oven and slowly heated from 25° C. to 120° C. for 21 hours so as to perform polymerization. After the completion of polymerization, the mold was removed from the oven. The release properties of a molded product from the mold were good. The obtained molded product was further subjected to an annealing treatment at 130° C. for 2 hours.

After the annealing treatment, the molded product was washed with a 10% aqueous potassium hydroxide solution in an ultrasonic washing bath at 50° C. for 5 minutes. Thereafter, the molded product was washed with distilled water and isopropanol, and the surface of the lens was dried at 50° C. The washed molded product was immersed in a hard coat composition containing silicon oxide, trimethoxymethylsilane and a hydrolysate thereof, taken up at a speed of 150 mm/min to coat the molded product. Thereafter, the molded product was preheated at 80° C. for 10 minutes, and then heated and cured at 110° C. for 2 hours to form a hard coat layer. A multilayered antireflection layer with five layers, including silicon oxide/zirconium oxide was formed on the molded product provided with a hard coat layer, using a vacuum deposition device, thereby obtaining a coat layer-attached lens.

Furthermore, the obtained molded product was transparent, coloration of the molded product was not observed, and the molded product had a refractive index (ne) of 1.56, an Abbe number (ve) of 41, a specific gravity of 1.26, and heat resistance of 82° C. Further, the molded product was subjected to an alkali test, and thus, white turbidity of the lens was observed after 30 minutes have passed. In addition, the appearance of the lens immediately after release was observed under irradiation with a high-pressure mercury lamp or the like, and thus, turbidity was observed.

In addition, the coat layer-attached lens was subjected to an impact resistance test in accordance with JIS K7211-2 to calculate a fracture energy, which was found to be 4.9 J. The evaluation results are shown in Table-2.

Comparative Example 2

23.4 parts by weight of bis(4-isocyanatocyclohexyl)methane, 22.4 parts by weight of hexamethylene diisocyanate, 54.2 parts by weight of pentaerythritol tetrakis(3-mercaptopropionate), 0.17 parts by weight of dibutyl tin dichloride, 2.0 parts by weight of an ultraviolet ray absorber (manufactured by Kyodo Chemical Co., Ltd., product name: VIOSORB 583), and 0.065 parts by weight of an internal releasing agent (acidic phosphoric acid ester, manufactured by Mitsui Chemicals, Inc., product name: Internal Releasing Agent for MR) were mixed and dissolved to produce a homogeneous solution. This mixed solution was degassed at 400 Pa for 1 hour, then filtered using a 1 μm PTFE-made filter, and injected into a mold composed of a glass mold and a tape. The mold was put into a polymerization oven and slowly heated from 25° C. to 120° C. for 21 hours so as to perform polymerization. After the completion of polymerization, the mold was removed from the oven. The release properties of a molded product from the mold were good. The obtained molded product was further subjected to an annealing treatment at 130° C. for 2 hours.

After the annealing treatment, the molded product was washed with a 10% aqueous potassium hydroxide solution in an ultrasonic washing bath at 50° C. for 5 minutes. Thereafter, the molded product was washed with distilled water and isopropanol, and the surface of the lens was dried at 50° C. The washed molded product was immersed in a hard coat composition containing silicon oxide, trimethoxymethylsilane and a hydrolysate thereof, taken up at a speed of 150 mm/min to coat the molded product. Thereafter, the molded product was preheated at 80° C. for 10 minutes, and then heated and cured at 110° C. for 2 hours to form a hard coat layer. A multilayered antireflection layer with five layers, including silicon oxide/zirconium oxide was formed on the molded product provided with a hard coat layer, using a vacuum deposition device, thereby obtaining a coat layer-attached lens.

Furthermore, the obtained molded product was transparent, coloration of the molded product was not observed, and the molded product had a refractive index (ne) of 1.56, an Abbe number (ve) of 42, a specific gravity of 1.26, and heat resistance of 85° C. Further, the molded product was subjected to an alkali test, and thus, white turbidity of the lens was observed after 30 minutes have passed. In addition, the appearance of the lens immediately after release was observed under irradiation with a high-pressure mercury lamp or the like, and thus, turbidity was observed.

In addition, the coat layer-attached lens was subjected to an impact resistance test in accordance with JIS K7211-2 to calculate a fracture energy, which was found to be 3.6 J. The evaluation results are shown in Table-2.

Comparative Example 3

45.9 parts by weight of a mixture of 2,5-bis(isocyanatomethyl)-bicyclo[2.2.1]heptane and 2,6-bis(isocyanatomethyl)-bicyclo[2.2.1]heptane, 54.1 parts by weight of pentaerythritol tetrakis(3-mercaptopropionate), 0.03 parts by weight of dimethyl tin dichloride, 1.5 parts by weight of an ultraviolet ray absorber (manufactured by Kyodo Chemical Co., Ltd., product name: VIOSORB 583), and 0.10 parts by weight of an internal releasing agent (acidic phosphoric acid ester, manufactured by Mitsui Chemicals, Inc., product name: Internal Releasing Agent for MR) were mixed and dissolved to produce a homogeneous solution. This mixed solution was degassed at 400 Pa for 1 hour, then filtered using a 1 μm PTFE-made filter, and injected into a mold composed of a glass mold and a tape. The mold was put into a polymerization oven and slowly heated from 25° C. to 120° C. for 21 hours so as to perform polymerization. After the completion of polymerization, the mold was removed from the oven. The release properties of a molded product from the mold were good. The obtained molded product was further subjected to an annealing treatment at 130° C. for 2 hours.

After the annealing treatment, the molded product was washed with a 10% aqueous potassium hydroxide solution in an ultrasonic washing bath at 50° C. for 5 minutes. Thereafter, the molded product was washed with distilled water and isopropanol, and the surface of the lens was dried at 50° C. The washed molded product was immersed in a hard coat composition containing silicon oxide, trimethoxymethylsilane and a hydrolysate thereof, taken up at a speed of 150 mm/min to coat the molded product. Thereafter, the molded product was preheated at 80° C. for 10 minutes, and then heated and cured at 110° C. for 2 hours to form a hard coat layer. A multilayered antireflection layer with five layers, including silicon oxide/zirconium oxide was formed on the molded product provided with a hard coat layer, using a vacuum deposition device, thereby obtaining a coat layer-attached lens.

Furthermore, the obtained molded product was transparent, coloration of the molded product was not observed, and the molded product had a refractive index (ne) of 1.57, an Abbe number (ve) of 42, a specific gravity of 1.31, and heat resistance of 111° C. Further, the molded product was subjected to an alkali test, and thus, changes such as white turbidity of the lens was not observed after 30 minutes have passed. In addition, the appearance of the lens immediately after release was observed under irradiation with a high-pressure mercury lamp or the like, and thus, turbidity was not observed. In addition, the coat layer-attached lens was subjected to an impact resistance test in accordance with JIS K7211-2 to calculate a fracture energy, which was found to be 0.5 J. The evaluation results are shown in Table-2.

Comparative Example 4

54.3 parts by weight of a mixture of 2,5-bis(isocyanatomethyl)-bicyclo[2.2.1]heptane and 2,6-bis(isocyanatomethyl)-bicyclo[2.2.1]heptane, 45.7 parts by weight of 4-mercaptomethyl-1,8-dimercapto-3,6-dithiaoctane, 0.05 parts by weight of dimethyl tin dichloride, 1.5 parts by weight of an ultraviolet ray absorber (manufactured by Kyodo Chemical Co., Ltd., product name: VIOSORB 583), and 0.10 parts by weight of an internal releasing agent (acidic phosphoric acid ester, manufactured by Mitsui Chemicals, Inc., product name: Internal Releasing Agent for MR) were mixed and dissolved to produce a homogeneous solution. This mixed solution was degassed at 400 Pa for 1 hour, then filtered using a 1 μm PTFE-made filter, and injected into a mold composed of a glass mold and a tape. The mold was put into a polymerization oven and slowly heated from 25° C. to 120° C. for 21 hours so as to perform polymerization. After the completion of polymerization, the mold was removed from the oven. The release properties of a molded product from the mold were good. The obtained molded product was further subjected to an annealing treatment at 130° C. for 2 hours.

After the annealing treatment, the molded product was washed with a 10% aqueous potassium hydroxide solution in an ultrasonic washing bath at 50° C. for 5 minutes. Thereafter, the molded product was washed with distilled water and isopropanol, and the surface of the lens was dried at 50° C. The washed molded product was immersed in a hard coat composition containing silicon oxide, trimethoxymethylsilane and a hydrolysate thereof, taken up at a speed of 150 mm/min to coat the molded product. Thereafter, the molded product was preheated at 80° C. for 10 minutes, and then heated and cured at 110° C. for 2 hours to form a hard coat layer. A multilayered antireflection layer with five layers, including silicon oxide/zirconium oxide was formed on the molded product provided with a hard coat layer, using a vacuum deposition device, thereby obtaining a coat layer-attached lens.

Furthermore, the obtained molded product was transparent, coloration of the molded product was not observed, and the molded product had a refractive index (ne) of 1.62, an Abbe number (ve) of 39, a specific gravity of 1.31, and heat resistance of 116° C. Further, the molded product was subjected to an alkali test, and thus, changes such as white turbidity of the lens was not observed after 30 minutes have passed. In addition, the appearance of the lens immediately after release was observed under irradiation with a high-pressure mercury lamp or the like, and thus, turbidity was not observed.

In addition, the coat layer-attached lens was subjected to an impact resistance test in accordance with JIS K7211-2 to calculate a fracture energy, which was found to be 0.4 J. The evaluation results are shown in Table-2.

TABLE 1

| | Component A | Component B | Molar ratio (component A:component B) | Component C | | Refractive index (ne) | Abbe number (ve) | Heat resistance (° C.) | Specific gravity | Impact resistance (J) | Alkali test | Appearance |
|---|---|---|---|---|---|---|---|---|---|---|---|---|
| Example 1 | i-1 | i-2 | 34:66 | t-1 | — | 1.56 | 41 | 81 | 1.29 | 10.6 | ○ | ○ |
| Example 2 | i-1 | i-2 | 50:50 | t-1 | — | 1.56 | 41 | 87 | 1.30 | 6.2 | ○ | ○ |
| Example 3 | i-1 | i-2 | 40:60 | t-1 | t-2 | 1.60 | 39 | 83 | 1.29 | 11.2 | ○ | ○ |
| Example 4 | i-1 | i-2 | 55:45 | t-1 | t-2 | 1.60 | 39 | 91 | 1.30 | 4.4 | ○ | ○ |
| Example 5 | i-3 | i-2 | 80:20 | t-1 | — | 1.59 | 35 | 85 | 1.32 | 14.0 | ○ | ○ |
| Example 6 | i-4 | i-2 | 35:65 | t-1 | — | 1.56 | 41 | 77 | 1.28 | 10.5 | ○ | ○ |
| Example 7 | i-5 | i-2 | 35:65 | t-1 | — | 1.56 | 41 | 82 | 1.29 | 10.9 | ○ | ○ |
| Example 8 | i-1 | i-2 | 30:70 | t-1 | t-3 | 1.61 | 40 | 88 | 1.30 | 4.3 | ○ | ○ |

TABLE 2

| | Component A | Component B | Molar ratio (component A:component B) | Component C | Refractive index (ne) | Abbe number (ve) | Heat resistance (° C.) | Specific gravity | Impact resistance (J) | Alkali test | Appearance |
|---|---|---|---|---|---|---|---|---|---|---|---|
| Comparative Example 1 | i-6 | i-2 | 30:70 | t-1 | 1.56 | 41 | 82 | 1.26 | 4.9 | X | X |
| Comparative Example 2 | i-7 | i-2 | 40:60 | t-1 | 1.56 | 42 | 85 | 1.26 | 3.6 | X | X |
| Comparative Example 3 | i-1 | — | 100:0 | t-1 | 1.57 | 42 | 111 | 1.31 | 0.5 | ○ | ○ |
| Comparative Example 4 | i-1 | — | 100:0 | t-2 | 1.62 | 39 | 116 | 1.31 | 0.4 | ○ | ○ |

1-1: A mixture of 2,5-bis(isocyanatomethyl)-bicyclo[2.2.1]heptane and 2,6-bis(isocyanatomethyl)-bicyclo[2.2.1]heptane
i-2: Hexamethylene diisocyanate
i-3: m-Xylylene diisocyanate
i-4: 1,3-Bis(isocyanatomethyl)cyclohexane
i-5: 1,4-Bis(isocyanatomethyl)cyclohexane
i-6: Isophorone diisocyanate
i-7: Bis(4-isocyanatocyclohexyl)methane
t-1: Pentaerythritol tetrakis(3-mercaptopropionate)
t-2: 4-Mercaptomethyl-1,8-dimercapto-3,6-dithiaoctane
t-3: A mixture of 5,7-dimercaptomethyl-1,11-dimercapto-3,6,9-trithiaundecane, 4,7-dimercaptomethyl-1,11-dimercapto-3,6,9-trithiaundecane, and 4,8-dimercaptomethyl-1,11-dimercapto-3,6,9-trithiaundecane From the above results, it was found that a molded product obtained from the polymerizable composition of the present invention has improved impact resistance and alkali resistance, as compared with Comparative Examples.

By the polymerizable composition of the present invention, a molded product or an optical material, having excellent impact resistance and alkali resistance, is obtained. Further, the optical material obtained from the polymerizable composition of the present invention also has an excellent balance among optical characteristics such as a refractive index and an Abbe number, handling properties, transparency, and heat resistance.

Such a polymerizable composition can be suitably used as a molded product for an optical material which requires a high refractive index, high impact resistance, and alkali resistance, and in particular, in a plastic lens for eyeglasses.

The present application claims priority based on Japanese Patent Application No. 2014-161314, filed on Aug. 7, 2014, and Japanese Patent Application No. 2014-206449, filed on Oct. 7, 2014, the contents of which are incorporated herein by reference.

The invention claimed is:

1. A polymerizable composition comprising:
at least one isocyanate compound (A) having a cyclic structure, selected from compounds represented by the following Formulae (1), (2), and (3):

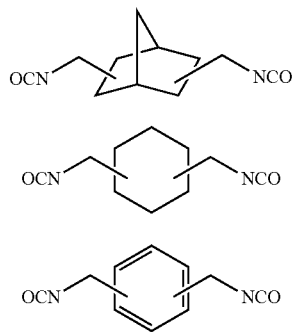

an aliphatic isocyanate compound (B) having 4 to 11 carbon atoms; and
a thiol compound (C) comprised of at least one selected from 4,6-bis(mercaptomethylthio)-1,3-dithiane, 2-(2,2-bis(mercaptomethylthio)ethyl)-1,3-dithiethane, pentaerythritol tetrakis(3-mercaptopropionate), pentaerythritol tetrakis(2-mercaptoacetate), trimethylolpropane tris(3-mercaptopropionate), trimethylolpropane tris(2-mercaptoacetate), 4-mercaptomethyl-1,8-dimercapto-3,6-dithiaoctane, 2,5-bismercaptomethyl-1,4-dithiane, 1,1,3,3-tetrakis(mercaptomethylthio)propane, 5,7-dimercaptomethyl-1,11-mercapto-3,6,9-trithiaundecane, 4,7-dimercaptomethyl-1,11-mercapto-3,6,9-trithiaundecane, 4,8-dimercaptomethyl-1,11-mercapto-3,6,9-trithiaundecane, ethylene glycol bis(3-mercaptopropionate), diethylene glycol bis(3-mercaptopropionate), ethylene glycol bis(2-mercaptoacetate), and diethylene glycol bis(2-mercaptoacetate),
wherein the proportion of the number of moles of the isocyanate compound (A) is 30% to 60% with respect to 100% of the sum of the number of moles of the isocyanate compound (A) and the number of moles of the aliphatic isocyanate compound (B).

2. The polymerizable composition according to claim 1, wherein the aliphatic polythiol compound having at least one ester bond within a molecule is comprised of at least one selected from pentaerythritol tetrakis(3-mercaptopropionate), pentaerythritol tetrakis(2-mercaptoacetate), trimethylolpropane tris(3-mercaptopropionate), trimethylolpropane tris(2-mercaptoacetate), ethylene glycol bis(3-mercaptopropionate), diethylene glycol bis(3-mercaptopropionate), ethylene glycol bis(2-mercaptoacetate), and diethylene glycol bis(2-mercaptoacetate).

3. A molded product formed by curing the polymerizable composition according to claim 1.

4. An optical material comprising the molded product according to claim 3.

5. A lens comprising the optical material according to claim 4.

6. An eyeglass lens comprising the lens according to claim 5.

7. An eyeglass lens comprising:
the lens according to claim 5, and
a hard coat layer and/or an antireflection coat layer stacked over at least one surface of the lens.

* * * * *